United States Patent [19]
Irifune et al.

[11] Patent Number: 5,391,405
[45] Date of Patent: Feb. 21, 1995

[54] METHOD FOR SURFACE-RELEASE COATING AND COATING AGENT THEREFOR

[75] Inventors: Shinji Irifune; Toshio Ohba, both of Gunma, Japan

[73] Assignee: Shin-Etsu Chemical Co., Ltd., Tokyo, Japan

[21] Appl. No.: 964,685

[22] Filed: Oct. 22, 1992

Related U.S. Application Data

[63] Continuation-in-part of Ser. No. 824,674, Jan. 23, 1992, abandoned.

[30] Foreign Application Priority Data

Jan. 23, 1991 [JP] Japan .................... 3-41424

[51] Int. Cl.$^6$ .................... B05D 3/06; C08G 77/20; C08F 2/50
[52] U.S. Cl. .................... 427/515; 427/516; 522/99; 528/32
[58] Field of Search ........... 526/279; 427/515, 516; 522/99; 528/32

[56] References Cited

U.S. PATENT DOCUMENTS

| | | | |
|---|---|---|---|
| 4,201,808 | 5/1980 | Cully et al. | 522/99 |
| 4,348,454 | 9/1982 | Eckberg | 522/99 |
| 4,568,566 | 2/1986 | Tolentino | 427/54.1 |
| 4,640,967 | 2/1987 | Eckberg | 522/99 |
| 4,908,274 | 3/1990 | Jachmann et al. | 528/32 |

FOREIGN PATENT DOCUMENTS

| | | |
|---|---|---|
| 0018624 | 11/1980 | European Pat. Off. |
| 0336141 | 10/1989 | European Pat. Off. |

*Primary Examiner*—Susan W. Berman
*Attorney, Agent, or Firm*—Millen, White, Zelane & Branigan

[57] ABSTRACT

Disclosed is a method for imparting anti-sticking surface-releasability to the surface of a substrate which comprises: coating the surface with a novel radiation-curable (meth)acryloxy-containing organopolysiloxane; and curing the coating layer by the irradiation with radiation such as electron beams and ultraviolet light. Different from conventional radiation-curable (meth)acryloxy-containing organopolysiloxanes, the novel organopolysiloxane here used is characteristic in comprising at least one trifunctional organosiloxane unit in a molecule, by virtue of which the (meth)acryloxy-containing organopolysiloxane has good curability by the irradiation to exhibit excellent surface-releasability with high durability against aging.

19 Claims, No Drawings

METHOD FOR SURFACE-RELEASE COATING AND COATING AGENT THEREFOR

CROSS-REFERENCE TO RELATED APPLICATION

This is a continuation-in-part application of U.S. patent application Ser. No. 07/824,674, filed Jan. 23, 1992, now abandoned.

BACKGROUND OF THE INVENTION

The present invention relates to a method for surface-release coating and a coating agent therefor which is a radiation-curable organopolysiloxane or a composition comprising the same. More particularly, the invention relates to a method for surface-release coating and a coating agent therefor which is a radiation-curable organopolysiloxane or a composition comprising the same capable of being readily cured by the irradiation with radiation such as electron beams and ultraviolet light to form a cured film having surface-releasability so as to be useful as an anti-sticking treating agent of the back surface of pressure-sensitive adhesive tapes and a coating agent of release paper sheets for temporary protection of pressure-sensitive adhesive labels.

Among various types of radiation-curable organopolysiloxane compositions, those most widely used in the above mentioned applications are formulated with an organopolysiloxane having (meth)acryloxy groups in the molecule as the principal ingredient. These (meth)acryloxy-containing organopolysiloxanes are prepared, for example, by the method disclosed in Japanese Patent Kokai 63-135426 and 2-45533, in which the (meth)acryloxy groups are introduced into the molecules of the organopolysiloxane by utilizing the ring-opening addition reaction of epoxy groups or by the method disclosed in Japanese Patent Kokai 48-48000 and 2-163166, in which the hydrosilation reaction is utilized for introducing the (meth)acryloxy groups into the organopolysiloxane molecules.

The (meth)acryloxy-containing organopolysiloxanes prepared by the above mentioned prior art methods can of course be used as such or as the principal ingredient of a radiation-curable organopolysiloxane composition used for surface-release coating. These radiation-curable organopolysiloxanes, however, have a problem due to the strong polarity of the (meth)acryloxy groups. While the radiation-curability of the organopolysiloxane or a composition thereof can be increased by increasing the content of the (meth)acryloxy groups in the organopolysiloxane, namely, the surface tension and the resistance against peeling of the coating layer are increased so much by increasing the content of the (meth)acryloxy groups in the organopolysiloxane to decrease the usefulness of the organopolysiloxane as a coating agent for the surface-release treatment. Moreover, the peeling resistance of the surface-release coating layer formed from the radiation-curable organopolysiloxane or a composition thereof is increased during the lapse of time even though the initial peeling resistance may be sufficiently small.

SUMMARY OF THE INVENTION

The present invention accordingly has an object to provide a novel method for surface-release coating and a radiation-curable organopolysiloxane or a composition comprising the same suitable as a surface-release coating agent free from the above described problems and disadvantages in the prior art radiation-curable (meth)acryloxy-containing organopolysiloxanes and compositions comprising the same as well as an improved method for surface-release coating.

Thus, the radiation-curable organopolysiloxane as the surface-release coating agent of the present invention or as a principal ingredient of the surface-release coating composition used in the inventive method is an organopolysiloxane represented by the general formula

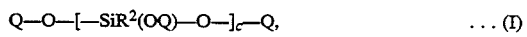

$$Q\text{—}O\text{—}[\text{—}SiR^2(OQ)\text{—}O\text{—}]_c\text{—}Q, \quad \ldots \text{(I)}$$

in which Q is a monovalent group represented by the general formula

$$R^2R^1{}_2Si\text{—}(\text{—}O\text{—}SiR^1R^2\text{—})_a\text{—}, \quad \ldots \text{(II)}$$

$R^1$ is a hydrogen atom or a monovalent hydrocarbon group selected from the class consisting of alkyl groups of 1 to 4 carbon atoms and phenyl group, $R^2$ is $R^1$ or a (meth)acryloxyalkyl group of the formula

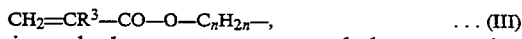

$$CH_2=CR^3\text{—}CO\text{—}O\text{—}C_nH_{2n}\text{—}, \quad \ldots \text{(III)}$$

$R^3$ being a hydrogen atom or a methyl group and n being 1, 2 or 3, with the proviso that the number of the (meth)acryloxyalkyl groups of the general formula (III) is in the range from 3 to 30% of the number of the silicon atoms or, namely, from 3 to 30% by moles of the groups in a molecule denoted by $R^2$ are the (meth)acryloxyalkyl groups, each of the subscripts a is, independently from the others, a positive integer in the range from 10 to 200 and the subscript c is 1, 2 or 3.

The method of the present invention for the surface-release coating of a substrate surface comprises coating the substrate surface with the above defined (meth)acryloxyalkyl-containing organopolysiloxane or a composition comprising the same to form a coating layer, and irradiating the coating layer with radiation such as electron beams and ultraviolet light in a dose sufficient to cure the organopolysiloxane.

DETAILED DESCRIPTION OF THE PREFERRED EMBODIMENTS

As is described above, the characteristic feature of the inventive method for the surface-release coating of a substrate surface consists in the use of the very specific radiation-curable (meth)acryloxyalkyl-containing organopolysiloxane represented by the above given general formula (I) or a composition comprising the same, which is applied to the substrate surface and cured by the irradiation with radiation.

In the general formula (I) representing the organopolysiloxane, Q is a monovalent group represented by the general formula (II), i.e. $R^2R^1{}_2Si\text{—}(\text{—}O\text{—}SiR^1R^2\text{—})_a\text{—}$, $R^1$ is a hydrogen atom or a monovalent hydrocarbon group selected from the class consisting of alkyl groups of 1 to 4 carbon atoms, e.g., methyl, ethyl, propyl and butyl groups, and phenyl group or, preferably, a methyl group, $R^2$ is $R^1$ or a (meth)acryloxyalkyl group of the general formula (III), i.e. $CH_2=CR^3\text{—}CO\text{—}O\text{—}C_nH_{2n}\text{—}$, $R^3$ being a hydrogen atom or a methyl group and n being 1, 2 or 3, each of the subscript a is, independently from the others, a positive integer in the range from 10 to 200 and the subscript c is 1, 2 or 3 or, preferably, 1. It is essential in order to ensure good radiation-curability of the organopolysiloxane that the number of the (meth)acryloxyalkyl groups of the general formula (III) is in the range from 3 to 30% of the number of the silicon atoms. When the molar proportion of the (meth)acryloxyalkyl groups in the molecule is too small, no sufficient radiation-curability can be obtained as a matter of course. When the molar proportion of the (meth)acryloxyalkyl groups is too large, on the other hand, the increase in the radiation-curability is necessarily accompanied by a decrease in the performance of the cured coating layer of the organopolysiloxane or a composition comprising the same or the cured coating layer would be too brittle not to meet the object of surface-release coating. In other words, the molar proportion of the (meth)acryloxyalkyl groups in the organopolysiloxane molecules relative to the number of the silicon atoms should be adequately selected depending on the balance between the radiation curability and the performance of the surface-release coating layer. The value of the subscript a is in the range from 10 to 200 because, when the value is too small, the organopolysiloxane after curing would exhibit only somewhat poor releasability while, when the value of a is too large, the organopolysiloxane has a viscosity too high to be smoothly applied to the surface of a substrate. The value of the subscript c should be 1, 2 or 3 or, preferably, 1 because, when it is zero, no surface-release coating layer having good performance can be obtained from the organopolysiloxane while difficulties are encountered in the synthesis of an organopolysiloxane of the general formula (I) in which the value of c is 4 or larger.

The (meth)acryloxyalkyl-containing organopolysiloxane of the general formula (I) can be prepared by the acid-catalyzed siloxane-rearrangement equilibration reaction in a reaction mixture consisting of: (A) an organopolysiloxane of the general formula

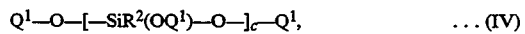

$$Q^1\text{—}O\text{—}[\text{—}SiR^2(OQ^1)\text{—}O\text{—}]_c\text{—}Q^1, \quad \ldots \text{(IV)}$$

in which $Q^1$ is a monovalent group of the formula $R^2R^1{}_2Si\text{—}$ and $R^1$, $R^2$ and $c$ each have the same meaning as defined above; (B) a cyclic trimer, tetramer or pentamer of the diorganosiloxane units of the formula $\text{—}SiR^1{}_2\text{—}O\text{—}$, such as octamethyl cyclotetrasiloxane; and (C) a cyclic trimer, tetramer or pentamer of the diorganosiloxane units of the formula $\text{—}SiR^1R^2\text{—}O\text{—}$ of which $R^2$ is a (meth)acryloxyalkyl group, such as 1,3,5,7-tetramethyl-1,3,5,7-tetra(3-acryloxypropyl) cyclotetrasiloxane, with admixture of trifluoromethane sulfonic acid as a catalyst in an amount of 0.1 to 0.5 part by weight per 100 parts by weight of the total amount of the above mentioned three organopolysiloxanes (A), (B) and (C) by heating the mixture at a temperature of 80° to 90° C. for 4 to 8 hours, preferably, under a stream of air.

Although the above mentioned acid-catalyzed equilibration reaction per se is old and widely used in the preparation of various organopolysiloxanes, the method is rarely utilized in the preparation of an organopolysiloxane having reactive functional groups sensitive to acids. In particular, (meth)acryloxy-containing organopolysiloxanes are prepared in the prior art by introducing the (meth)acryloxy groups into an organopolysiloxane by utilizing the addition reaction of hydrosilation or dehydrochlorination condensation reaction despite the troublesome and lengthy process involving a number of steps. On the other hand, the (meth)acryloxyalkyl-containing organopolysiloxane of the general formula (I) can be prepared by the acid-catalyzed equilibration reaction of (meth)acryloxy-containing organopolysiloxane oligomers conducted under specific reaction conditions which provide a possibility of obtaining (meth)acryloxy-containing organopolysiloxanes having a degree of polymerization and content of the (meth)acryloxyalkyl groups as desired.

The (meth)acryloxy-containing organopolysiloxane prepared in the above described manner can be used as such as a radiation-curable surface-release coating agent which of course can be a mixture of two kinds or more of the (meth)acryloxyalkyl-containing organopolysiloxanes having different degrees of polymerization and/or different contents of the (meth)acryloxyalkyl groups according to need. It is optional that the radiation-curable surface-release treating agent further comprises various kinds of known additives including photochemical reaction initiators such as acetophenone, benzophenone, 4-chlorobenzophenone, 4,4'-dimethoxy benzophenone, 4-methyl acetophenone, benzoin methyl ether, benzoin trialkylsilyl ethers and the like, suppressing agents against oxygen-induced curing inhibition such as diethyl amine, 2-(diethylamino)ethyl alcohol, piperidine and the like, reactive diluents such as 1,6-hexane diol diacrylate, trimethylol propane triacrylate and the like, organic solvents, levelling agents, fillers, antistatic agents, defoaming agents, pigments and the like as well as organopolysiloxanes having no (meth)acryloxy groups.

The (meth)acryloxyalkyl-containing organopolysiloxane or a composition comprising the same can be used as an anti-sticking coating agent on the back surface of pressure-sensitive adhesive tapes, protecting coating agent on the surface of metal- and plastic-made articles and vehicle resin of coating compositions. In the use thereof, the surface of paper sheets, various kinds of plastic films and foils of a metal, e.g., aluminum, is coated therewith using a bar coater, gravure coater, reverse coater and the like in a thickness of 0.1 to 200 $\mu$m and the coating layer is cured by the irradiation with radiation. Various kinds or radiations can be used for the purpose of curing including electron beams, gamma-rays and other radiations emitted from a radioactive substance and ultraviolet light emitted from mercury arcs and medium- and high-pressure mercury lamps. Full curing of the coating layer can be obtained by the irradiation with electron beams in a dose of 2 to 5 Mrads or, when the radiation is ultraviolet light, by the irradiation for 0.1 to 10 seconds with the ultraviolet light emitted from a 2-kW high-pressure mercury lamp of 80 watts/cm output at a distance of 8 cm from the surface under irradiation.

In the following, the present invention is described in more detail by way of examples and comparative examples as preceded by a description of the procedure for the preparation of the radiation-curable (meth)acryloxyalkyl-containing organopolysiloxane. In the following description, the term of "parts" always refers to "parts by weight" and the values of the viscosity and refractive index are all those obtained by the measurements at 25° C. Following are the procedures of the testing methods for the evaluation of the curability of the coating layer, resistance against peeling of an adhesively bonded sheet from the releasing surface and adhesiveness retention of the pressure-sensitive adhesive tape peeled off from the releasable surface.

Curability of the surface-release agent

A polyethylene-laminated paper sheet was coated with the (meth)acryloxyalkyl-containing organopolysiloxane or a composition comprising the same to form a coating layer in a coating amount of about 1.0 g/m², which was cured by the irradiation with radiation into a fully cured coating film to record the minimum dose in Mrads when the irradiation was performed with electron beams, or to record the minimum length of time of the irradiation in seconds when the radiation was ultraviolet light emitted from two 8-kW high-pressure mercury lamps of 80 watts/cm output at a distance of 8 cm from the surface under irradiation. The state of curing was recorded as complete when the cured coating layer did not fall off the substrate surface nor become cloudy by gently rubbing the surface with a finger tip.

Peeling resistance

An acrylic resin-based, solution-type pressure-sensitive adhesive (Oribine BPS-8170, a product by Toyo Ink Manufacturing Co.) was applied to the surface of the 1 μm thick coating layer of the organopolysiloxane fully cured by the irradiation with radiation on a polyethylene-laminated paper sheet in a coating thickness of 130 μm and dried by heating at 100° C. for 3 minutes. A sheet of overlay paper having a basis weight of 64 g/m² was applied and bonded to the adhesive-coated surface and subjected to aging at 25° C. for 20 hours. The sheet after aging was cut into a strip of 5 cm width of which the overlay paper was peeled off from the polyethylene-laminated paper by pulling in an angle of 180° on a tensile testing machine at a pulling velocity of 300 mm/minute to determine the resistance against peeling in g/5 cm. This peeling test was undertaken for the sheet sample as prepared and for the sheet sample after aging for 3 days at 70° C. under a load of 70 g/cm² to give an initial value and a value after aging, respectively.

Adhesiveness retention

A polyester film-based, pressure-sensitive adhesive tape (Lumirror 31B, a product by Nitto Electric Industry Co.) was applied and bonded to the surface of the 1 μm thick coating layer of the organopolysiloxane fully cured by the irradiation with radiation on a polyethylene-laminated paper sheet and kept for 20 hours at 70° C. under a load of 20 g/cm². Thereafter, the adhesive tape was taken by peeling from the polyethylene-laminated paper and again applied and bonded to the well polished and cleaned surface of a stainless steel plate followed by the peeling resistance test of the adhesive tape by pulling in an angle of 180° at a pulling velocity of 300 mm/minute to give a first value of the peeling resistance in g/25 mm. Separately, the same peeling test of the same adhesive tape from the stainless steel plate was undertaken except that the adhesive tape bonded to the stainless steel plate was fresh before contacting with the surface of the cured coating layer of the organopolysiloxane to give a second value of the peeling resistance in g/25 mm. The adhesiveness retention was calculated as a ratio of the first peeling resistance to the second peeling resistance in %.

Synthetic Preparation 1.

Into a four-necked flask of 1 liter capacity equipped with a stirrer, thermometer and Dimroth condenser were introduced 16 g of tris(trimethylsiloxy) methyl silane, 666 g of octamethyl cyclotetrasiloxane and 154 g of 1,3,5,7-tetramethyl-1,3,5,7-tetra(3-acryloxypropyl) cyclotetrasiloxane to form a mixture which was admixed with 20 ppm by weight of N,N'-diphenyl-1,4-diaminobenzene and agitated for 5 minutes at room temperature. Thereafter, the mixture was further admixed with 2.0% by weight of trifluoromethane sulfonic acid and heated up to 80° to 85° C. under a stream of air taking 2 hours under agitation followed by further continued agitation for additional 6 hours at the same temperature to effect the siloxane-rearrangement equilibration reaction. After completion of the reaction, the reaction mixture was cooled to room temperature and admixed with triethyl amine in an amount of 3 times by moles relative to the trifluoromethane sulfonic acid followed by further continued agitation for additional 5 hours to neutralize the acid in the reaction mixture. Thereafter, the reaction mixture was treated with active charcoal and flitrated and the flitrate was freed from volatile matters by stripping at 110° C. under a pressure of 4 mmHg to give a clear, light yellow liquid as a product in a yield of 92% based on the total amount of three kinds of the starting organopolysiloxanes. This product, referred to as the organopolysiloxane I hereinbelow, had a viscosity of 370 centipoise and a refractive index of 1.418 and the results of the infrared absorption spectrophotometric and NMR spectroscopic analyses indicated that it was expressed by the average unit formula of $$[Me_3SiO_{0.5}]_3[Me_2SiO]_{180}[Me(CH_2=$$
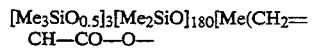
$$—C_3H_6)SiO]_{18}[MeSiO_{1.5}],$$

in which Me is a methyl group.

Synthetic Preparation 2.

The synthetic procedure was substantially the same as in Synthetic Preparation 1 described above except that the starting mixture of the organopolysiloxane oligomers was prepared from 31 parts of tris(trimethylsiloxy) methyl silane, 592 parts of octamethyl cyclotetrasiloxane and 310 parts of 1,3,5,7-tetramethyl-1,3,5,7-tetra(3-acryloxypropyl) cyclotetrasiloxane. A red, clear liquid product, referred to as the organopolysiloxane II hereinbelow, was obtained in a yield of 94% based on the total amount of the above mentioned three organopolysiloxane oligomers. The product had a viscosity of 210 centipoise and a refractive index of 1.427 and could be expressed by the average unit formula $$[Me_3SiO_{0.5}]_3[Me_2SiO]_{80}[Me(CH_2=$$
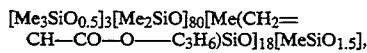
$$CH—CO—O——C_3H_6)SiO]_{18}[MeSiO_{1.5}],$$

in which Me is a methyl group.

Synthetic Preparation 3.

The synthetic procedure was substantially the same as in Synthetic Preparation 1 described above except that the starting mixture of organopolysiloxanes was prepared from 31 parts of an organopolysiloxane expressed by the average unit formula $(Me_3SiO_{0.5})_5(MeSiO_{1.5})_3$, 648 parts of octamethyl cyclotetrasiloxane and 155 parts of 1,3,5,7-tetramethyl-1,3,5,7-tetra(3-methacryloxypropyl) cyclotetrasiloxane to give a clear, light yellow liquid product, referred to as the organopolysiloxane III hereinbelow, having a viscosity of 520 centipoise and a refractive index of 1.415 in a yield of 90% based on the total amount of the above mentioned three kinds of the organopolysiloxanes. This product could be expressed by the average unit formula

[Me₃SiO₀.₅]₅[Me₂SiO]₁₇₅[Me(CH₂=CH—CO—O—C₃H₆)SiO]₁₈[MeSiO₁.₅]₃, in which Me is a methyl group.

Synthetic Preparation 4.

The synthetic procedure was substantially the same as in Synthetic Preparation 1 described above except that the starting mixture of organopolysiloxanes was prepared from 9 parts of hexamethyl disiloxane, 760 parts of octamethyl cyclotetrasiloxane and 176 parts of 1,3,5,7-tetramethyl-1,3,5,7-tetra(3-acryloxypropyl) cyclotetrasiloxane to give a clear, light yellow liquid product, referred to as the organopolysiloxane IV hereinbelow, having a viscosity of 820 centipoise and a refractive index of 1.416 in a yield of 90% based on the total amount of the above mentioned three kinds of starting organopolysiloxane oligomers. The results of the infrared absorption spectrophotometric and NMR spectroscopic analyses indicated that this product could be expressed by the average unit formula

[Me₃SiO₀.₅]₂[Me₂SiO]₁₈₀[Me(CH₂=CH—CO—O—C₃H₆)SiO]₁₈, in which Me is a methyl group.

Synthetic Preparation 5.

The synthetic procedure was substantially the same as in Synthetic Preparation 1 described above except that the starting mixture of organopolysiloxanes was prepared from 16 parts of hexamethyl disiloxane, 592 parts of octamethyl cyclotetrasiloxane and 310 parts of 1,3,5,7-tetramethyl-1,3,5,7-tetra(3-acryloxypropyl) cyclotetrasiloxane to give a clear, red liquid product, referred to as the organopolysiloxane V hereinbelow, having a viscosity of 400 centipoise and a refractive index of 1.428 in a yield of 90% based on the total amount of the starting three organopolysiloxane oligomers. The results of the infrared absorption spectrophotometric and NMR spectroscopic analyses indicated that this product could be expressed by the average unit formula

[Me₃SiO₀.₅]₂[Me₂SiO]₈₀[Me(CH₂=CH—CO—O—C₃H₆)SiO]₁₈, in which Me is a methyl group.

Example 1.

Each of the organopolysiloxanes I to V prepared in the Synthetic Preparations 1 to 5 described above, of which the organopolysiloxanes I to III were for the invention and IV and V were for comparative purpose, was subjected to the evaluation tests for the curability by the electron beam irradiation, peeling resistance and adhesiveness retention in the respective procedures described before to give the results shown in Table 1 below.

Example 2.

Each of the organopolysiloxanes I to V admixed with 5% by weight of benzoin isobutyl ether was evenly applied to the surface of a polyethylene-laminated paper sheet in a coating amount of 1.0 g/m² and subjected to the evaluation tests for the curability by the ultraviolet irradiation in air, peeling resistance and adhesiveness retention to give the results shown in Table 2 below.

TABLE 1

| Organopoly-siloxane No. | Curability, Mrads | Adhesiveness retention, % | Peeling resistance, g/5 cm initial | Peeling resistance, g/5 cm after aging |
|---|---|---|---|---|
| I | 2.0 | 96 | 107 | 100 |
| II | 1.5 | 106 | 285 | 298 |
| III | 2.0 | 95 | 92 | 102 |
| IV | 2.0 | 97 | 150 | 270 |
| V | 1.5 | 100 | 330 | 600 |

TABLE 2

| Organopoly-siloxane No. | Curability, seconds | Adhesiveness retention, % | Peeling resistance, g/5 cm initial | Peeling resistance, g/5 cm after aging |
|---|---|---|---|---|
| I | 3.6 | 94 | 92 | 105 |
| II | 0.9 | 98 | 195 | 207 |
| III | 4.5 | 90 | 85 | 94 |
| IV | 3.2 | 94 | 132 | 240 |
| V | 0.8 | 97 | 285 | 490 |

What is claimed is:

1. A radiation-curable organopolysiloxane compound represented by the general formula Q—O—[—SiR²(OQ)—O—]_c—Q, in which Q is a monovalent group represented by the general formula R²R¹₂Si—(—O—SiR¹R²—)_a—, R¹ is a hydrogen atom or a monovalent hydrocarbon group selected from the class consisting of alkyl groups having 1 to 4 carbon atoms and phenyl group, R² is R¹ or a (meth)acryloxyalkyl group of the formula CH₂=CR³—CO—O—C_nH_{2n}—, R³ being a hydrogen atom or a methyl group and n being 1, 2 or 3, with the proviso that from 3 to 30% by moles of the groups in a molecule denoted by R² are the (meth)acryloxyalkyl groups, each of the subscripts a is, independently from the others, a positive integer in the range from 10 to 200 and the subscript c is 1, 2 or 3.

2. The radiation-curable organopolysiloxane compound as claimed in claim 1 in which the group denoted by R¹ is a methyl group.

3. The radiation-curable organopolysiloxane compound as claimed in claim 2, in which the group denoted by R³ is a hydrogen atom.

4. The radiation-curable organopolysiloxane compound as claimed in claim 3, in which the subscript n is 3.

5. The radiation-curable organopolysiloxane compound as claimed in claim 4, in which the subscript c is 1.

6. The radiation-curable organopolysiloxane compound as claimed in claim 3, in which the subscript c is 1.

7. The radiation-curable organopolysiloxane compound as claimed in claim 2, in which the subscript n is 3.

8. The radiation-curable organopolysiloxane compound as claimed in claim 7, in which the subscript c is 1.

9. The radiation-curable organopolysiloxane compound as claimed in claim 2, in which the subscript c is 1.

10. The radiation-curable organopolysiloxane compound as claimed in claim 1 in which the group denoted by $R^3$ is a hydrogen atom.

11. The radiation-curable organopolysiloxane compound as claimed in claim 10, in which the subscript c is 1.

12. The radiation-curable organopolysiloxane compound as claimed in claim 1 in which the subscript n is 10.

13. The radiation-curable organopolysiloxane compound as claimed in claim 12, in which the subscript c is 1.

14. The radiation-curable organopolysiloxane compound as claimed in claim 1 in which the subscript c is 1.

15. A method for imparting anti-sticking surface-releasability to the surface of a substrate which comprises the steps of:
   (a) coating the surface with a coating agent which is a radiation-curable organopolysiloxane compound represented by the general formula $$Q-O-[-SiR^2(OQ)-O-]_c-Q,$$

in which Q is a monovalent group represented by the general formula $$R^2R^1{}_2Si-(-O-SiR^1R^2-)_a-,$$

$R^1$ is a hydrogen atom or a monovalent hydrocarbon group selected from the class consisting of alkyl groups having 1 to 4 carbon atoms and phenyl group, $R^2$ is $R^1$ or a (meth)acryloxyalkyl group of the formula $$CH_2=CR^3-CO-O-C_nH_{2n}-,$$

$R^3$ being a hydrogen atom or a methyl group and n being 1, 2 or 3, with the proviso that from 3 to 30% by moles of the groups in a molecule denoted by $R^2$ are the (meth)acryloxyalkyl groups, the subscripts a is, each independently from the others, a positive integer in the range from 10 to 200 and the subscript c is 1, 2 or 3, or a composition comprising the same to form a coating layer; and
   (b) irradiating the coating layer on the substrate surface with radiation in a dose sufficient to cure the coating agent.

16. The method for imparting anti-sticking surface-releasability to the surface of a substrate as claimed in claim 15 in which the coating layer is irradiated in step (b) with electron beams or ultraviolet light.

17. The method for imparting anti-sticking surface-releasability to the surface of a substrate as claimed in claim 15 in which the coating agent is a composition comprising the radiation-curable organopolysiloxane compound and a photochemical reaction initiator and the radiation is ultraviolet light.

18. A product as produced by claim 15.

19. A product according to claim 18, wherein $R^1$ is a methyl group, is a hydrogen atom, the subscript n is 3, and the subscript c is 1.

* * * * *

UNITED STATES PATENT AND TRADEMARK OFFICE
CERTIFICATE OF CORRECTION

PATENT NO. : 5,391,405
DATED : February 21, 1995
INVENTOR(S) : Shinji IRIFUNE et al.

It is certified that error appears in the above-indentified patent and that said Letters Patent is hereby corrected as shown below:

Claim 12; column 9, line 9:   Delete "10" and insert -- 3 --.

Claim 19; column 10, line 29: After "group," insert -- $R^3$ --.

Signed and Sealed this

Eighteenth Day of July, 1995

Attest:

BRUCE LEHMAN

Attesting Officer                Commissioner of Patents and Trademarks